United States Patent [19]

Gelissen et al.

[11] Patent Number: 5,448,307
[45] Date of Patent: Sep. 5, 1995

[54] SYSTEM FOR COMBINING MULTIPLE-FORMAT MULTIPLE-SOURCE VIDEO SIGNALS

[75] Inventors: Johan H. A. Gelissen; Robert A. H. .Van Twist, both of Eindhoven, Netherlands

[73] Assignee: U.S. Philips Corporation, New York, N.Y.

[21] Appl. No.: 165,601

[22] Filed: Dec. 9, 1993

[30] Foreign Application Priority Data

Dec. 11, 1992 [EP] European Pat. Off. ............. 9220387

[51] Int. Cl.⁶ .................. H04N 5/46; H04N 9/76; H04N 5/265
[52] U.S. Cl. .................. 348/584; 348/659; 348/598
[58] Field of Search ................ 348/555–558, 348/589, 598–600, 584, 453, 454, 638–642, 659, 440; H04N 5/46, 9/76, 5/262, 5/265, 9/66,

[56] References Cited
U.S. PATENT DOCUMENTS

| | | | |
|---|---|---|---|
| 4,661,844 | 4/1987 | Rufray et al. | 348/640 |
| 4,876,600 | 10/1989 | Pietzsch et al. | 358/183 |
| 5,293,540 | 3/1994 | Trani et al. | 348/584 |

*Primary Examiner*—James J. Groody
*Assistant Examiner*—Cheryl Cohen
*Attorney, Agent, or Firm*—David Schreiber

[57] ABSTRACT

The system generates a composite image on a pixel-by-pixel basis by selectively mapping source pixels provided by video sources of different video formats onto destination pixels in the composite image. The mapping is accomplished by encoding the source pixels into digital words, each word having a color information part and a video format identifier, used to decode the color information part upon processing to organize the composite image. Combining video signals with computer-generated graphics data is achieved under control of the graphics data being interpreted either as video format identifier or as color. If the color of the destination pixel is determined by one of the video sources, the graphics data is used to select the appropriate decoding. The system permits a modular architecture and simple merging with a PC.

8 Claims, 4 Drawing Sheets

SYSTEM FOR COMBINING MULTIPLE-FORMAT MULTIPLE-SOURCE VIDEO SIGNALS

FIELD OF THE INVENTION

The invention relates to a system for generating a composite image by selectively combining a plurality of simultaneously available video signals with one another on a pixel-by-pixel basis.

BACKGROUND ART

Such system is known from U.S. Pat. No. 4,876,600. This prior art reference discloses an apparatus to produce a composite image from information supplied by a plurality of independently and mutually asynchronously operating sources, such as TV cameras, mass storage for digital image data and raster graphic generators. The sources provide the information to a plurality of dual-ported buffers. The data stored in the buffers are read in a synchronized manner. A pre-programmed mask storage selects on a pixel-by-pixel basis which one of the buffers is to supply the information for a given pixel of the composite image. The mask storage furnishes control data words that each comprise a number of bits equal to that of the number of sources to be handled. That is, the data width which may be read in parallel corresponds exactly to the number of sources. One bit is set per data word to achieve this selectivity feature.

The prior art reference does not address the problem of signals that are mutually differently formatted. Generally, video signals occur in an analog representation, such as certain TV signals, or in a digital representation such as computer-generated graphics. In addition, each such representation may have its information contents encoded in a variety of ways, dependent on the signal's intended use (display, editing, storage, transmission, etc.). Following video signal types are mentioned here by way of example: compressed still images (JPEG), uncompressed still images, compressed moving images (MPEG), uncompressed moving images (PAL, NTSC, SECAM, D2MAC, HDMAC, YUV, Y/C, RGB, RS170A, RS330), video patterns, etc. The video signals and the graphics are necessarily reformatted in a common format before they can be simultaneously displayed on a same display, e.g., a PC's monitor.

OBJECT OF THE INVENTION

The format issue briefly touched upon above may serve to indicate that selectively combining on a real-time basis a plurality of differently formatted, simultaneously available and mutually asynchronous video signals with one another and/or with computer-generated graphics gives rise to a non-trivial handling of data.

It is an object of the invention to provide a system for combining a plurality of video signals with one another, wherein real-time processing is feasible for practically an unlimited number of simultaneously available video signals from different sources, irrespective of their formats. It is another object of the invention to support a modular approach with regard to the organization of operations to be performed and regarding system architecture.

SUMMARY OF THE INVENTION

To achieve these goals, the invention provides a system for creating a composite image by selectively combining a plurality of simultaneously available video signals with one another on a pixel-by-pixel basis. The system comprises input means, operative to receive the plurality of video signals, each respective one of the video signals having a respective video format, and encoding means connected to the input means for encoding respective ones of the video signals into data items provided at an encoder output. Each particular one of the data items corresponds to a particular source pixel and functionally has a color identifier to identify a colour of the particular source pixel and a format identifier to identify the respective video format. The system further includes multiplexing means having a multiplexing input coupled to the encoder output for transferring a selected one of the data items to a multiplexing output, and memory means for storage of the selected data item. The memory means has a memory input coupled to the multiplexing output and has a memory output. The system also includes decoding means coupled to the memory output to receive the selected data item and to decode the color identifier of the selected data item for determining a colour of a specific one of destination pixels of the composite image under control of the format identifier of the selected data item.

In the invention, source pixels are extracted from the video signals. The source pixels are represented as data items of a specific kind. Each data item has colour information and format information. The color of a specific destination pixel of the composite image is determined by selecting one of the data items and decoding the selected data item's colour identifier under control of the selected data item's format identifier. Prior to decoding, the data items are organized in a memory means.

The system of the invention permits a modular architecture. Using the common, predetermined representation of the video signals as data items with colour and with format identifiers uncouples the type and format of the video signals at the input means from the organizational processing in the memory means. Further, any system supported internal format for encoding the data items can be adopted as long as the functionalities of color key and format key are unambiguously and retrievably defined. The internal format can be adapted to, e.g., the memory organization and processing capabilities of memory management, or to a suitable and predetermined window-based data handling instruction set, or to another kind of preprocessing executed on the uniformly formatted data items. The use of the internal format also renders the system versatile regarding the format of the composite image. The composite image format is to be adapted to the destination device that displays, stores or processes the eventually generated composite image. Changing the destination device's format may occur, for example, when a monitor of one type, used for display of the composite image, is replaced by a monitor of another type. The replacement may need adaption to, e.g., the physical characteristics of the new monitor, due to the particular phosphor compounds used in the monitor's screen ("gamma-correction"). Changing the format of the composite image is achieved through the decoding means, again without interfering with the organizational processing in the memory means.

The system is readily modified to handle a larger number of simultaneously available video signals by appropriately extending the encoding means and the decoding means and the capability of the multiplexing means. In order to enhance the system's modularity, the multiplexing means preferably includes a bus means for under control of a selection protocol transferring the selected one of the data items to the decoding means.

The format identifier may functionally be the same as a video source identifier when each individual video source supplies video signals of only a single video format. Also, the number of bits used to encode the color information per source pixel may depend on the specific type of video signal to be encoded. This may stem from the fact that a video signal of a particular type needs fewer bits per source pixel to represent the pixel's available colour information than a video signal of another type. By providing adequate memory management means to handle variable word lengths, an efficient use is made of the available memory space.

Preferably, the system of the invention is operative to selectively combine the video signals with computer-generated graphics data on a pixel-by-pixel basis. To this end, the system comprises control means for specifying whether the plurality of video signals or the computer-generated graphics data is to determine the colour of the specific destination pixel, and further multiplexing means coupled between the memory means and the decoding means for determining the colour of the specific destination pixel under control of the control means. The further multiplexing means either transfers the colour identifier supplied by the memory means to the decoding means and transfers the graphics data to the decoding means for decoding the color identifier under control of the graphics data, the latter functioning as the format identifier, or transferring the graphics data to the decoding means for being decoded.

The memory means of the system in the invention comprises a colour identifier section to store the color identifier of the selected data item, and a format identifier section to store the format identifier of the selected data item. If the system includes a graphics data generator, such as a PC, preferably at least the format identifier section or the control means is implemented as a functional part of the graphics generator. In the system of the invention, the memory means has a source identifier section to store a source identifier for control of the first-mentioned multiplexing means. The source identifier section then also preferably is implemented as a functional part of the graphics generator.

Accordingly, the invention furnishes a system that permits combining video signals of various formats with computer generated graphics, preferably in window-based representation.

BRIEF DESCRIPTION OF THE DRAWINGS

The invention is explained in more detail by way of example and with reference to the accompanying drawing, wherein.

Throughout the Figures, same reference numerals are used to indicate similar or corresponding features.

DETAILED DESCRIPTION OF THE EMBODIMENTS

General

FIGS. 1–6 illustrate examples of a system according to the invention. The system creates a composite image out of a plurality of simultaneously available video signals I1, I2, . . . , In. Video signals I1–In may have mutually different video formats. The composite image is a pattern of destination pixels that each have a particular colour or grey level. The pattern is determined by selection of the video signals I1–In on a pixel-by-pixel basis. For each of the destination pixels one of the video signals I1–In is selected to supply a source pixel whose colour or grey level information then is to be mapped onto the destination pixel.

The video signals may be originated in, e.g., TV receivers, VCRs, video cameras, video disks, etc. The video signals may include the following types and formats: compressed still images (JPEG), uncompressed still images, compressed moving images (MPEG), uncompressed moving images (PAL, NTSC, SECAM, D2MAC, HDMAC, YUV, Y/C, RGB, RS170A, RS330). The signals may also be supplied by a video pattern generator or synthesizer.

First Example

Figure 1:
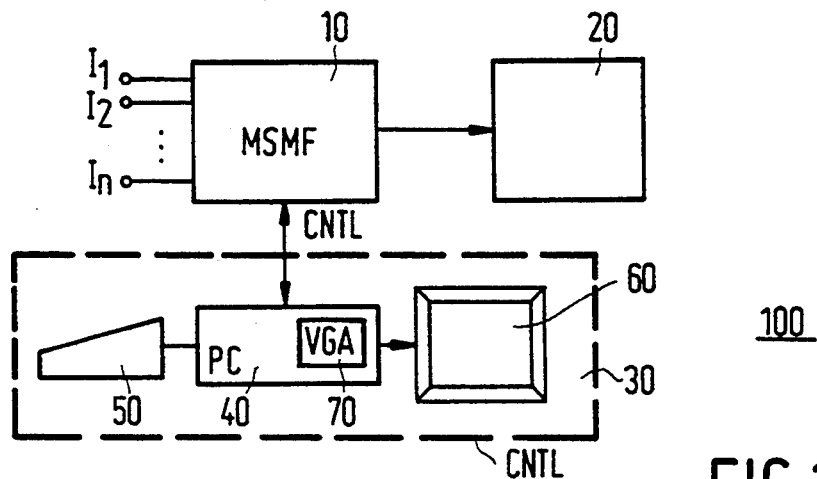
FIGS. 1 and 2 disclose a first example of a system in the invention.

FIG. 1 shows a first example of a system 100 in the invention. System 100 comprises a multiple-source-multiple-format signal processing device (MSMF) 10 for generating a composite image from a plurality of simultaneously available video signals I1–In of one or more video formats. The composite image is transferred to an image destination device 20, such as a memory or a monitor. Operation of MSMF 10 is controlled by a data processing apparatus 30. Apparatus 30 may comprise a PC 40 provided with a user-interface 50, such as a keyboard or a mouse, and a display 60 to enable interactive control of the image compilation. PC 40 may comprise a graphics unit 70 having, e.g., a VGA and a RAM to store graphics data.

Figure 2:
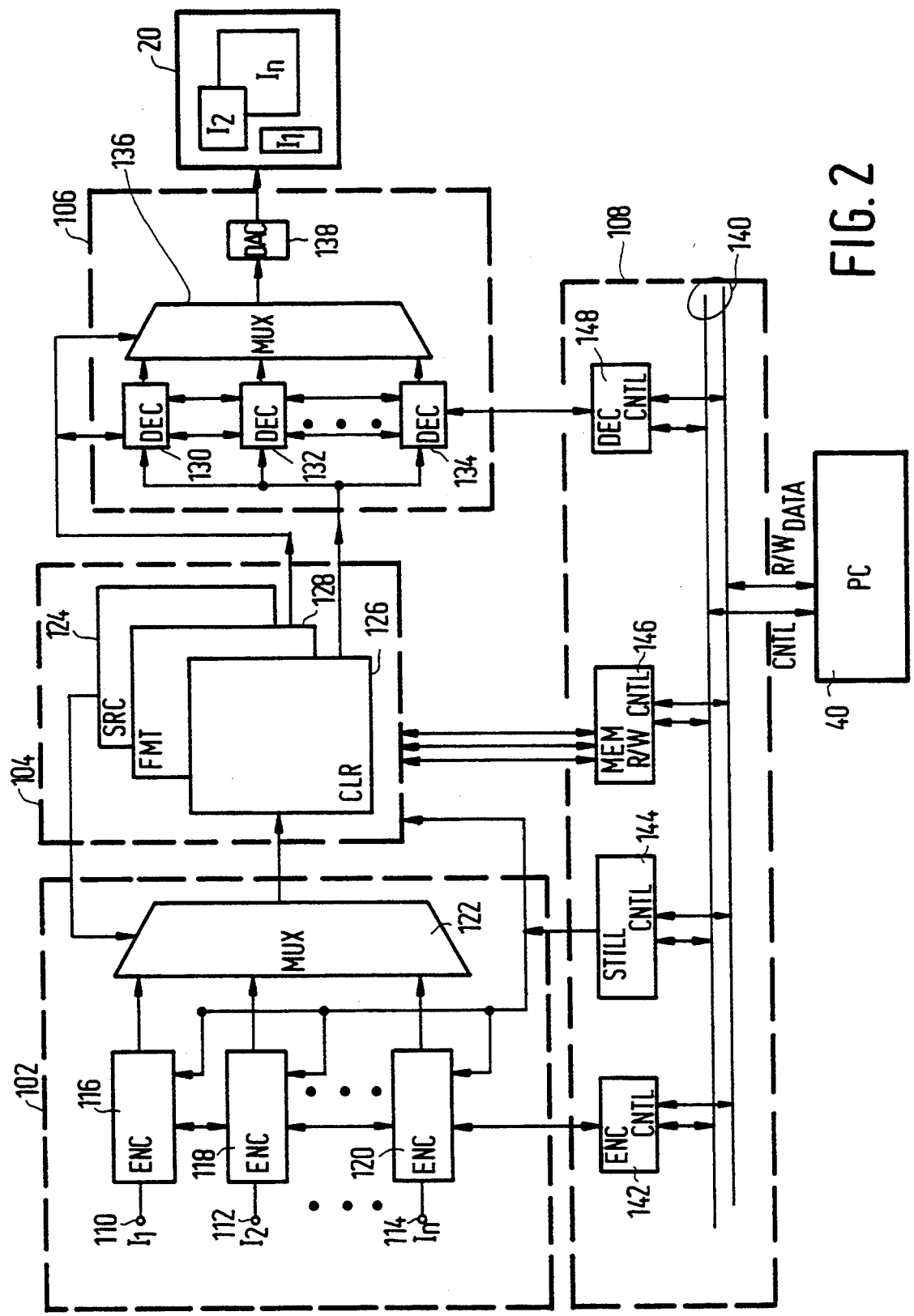

FIG. 2 shows MSMF 10 in more detail. MSMF 10 comprises the following functionalities: an encoding section 102, a display memory 104, a decoding section 106 and interface means 108 to PC 40. As explained below, encoding section 102 encodes incoming video signals I1–In into source pixels. The source pixels are supplied in one or more digital representations supported by the internal processing of MSMF 10. The source pixels comprise colour and video format information. Display memory 104 selectively stores the source pixels in a pattern corresponding to the pattern of destination pixels of the composite image. Decoding section 106 decodes the source pixel's colour information under control of the source pixel's video format information. The decoded colour information is presented in a common digital format for conversion into an analog signal adapted to monitor 20.

Encoding section 102 comprises a plurality of inputs 110, 112, . . . , 114 to receive video signals I1–In, each having its individual video format. The received video signals I1–In are respectively supplied to encoders 116, 118, . . . , 120 to encode each of video signals I1–In into respective sequences of digital words of one or more internal representations, adapted to the data processing capability of MSMF 10. A multiplexing means 122 selectively transfers the words supplied by encoders 116–120 to display memory 104.

Encoders 116–120 each include a memory (not shown) of the DRAM-, VRAM- or TVRAM-type to store the encoded signals. In addition, these memories take care of the difference in the rates of pixel information supplied to the encoder's output and pixel information derived from the video signal received. The video information typically includes an analog signal sequence based on a given scan rate and provided with identifiers (sync pulses) to indicate individual video lines that make up a complete video image (frame) and to indicate individual frames. The monitor, onto which the video signals are to be displayed simultaneously, may have a different scan rate. Scan rate conversion then is to be accomplished to adapt the supply of video images to the monitor's operation. In addition, time base correction is required to remove time-skewing between the monitor's lines and frames on the one hand and the start of the video line and of the video frame on the other hand.

The memories permit digital words from different ones among encoders 116–120 to be read out on the same time basis. The memory may be a DRAM, but preferably is a VRAM (video RAM) or TVRAM (triple-ported VRAM). As known, a VRAM is a random-access-memory that has a bidirectional random access data port and a bidirectional sequential access data port. Multiple-ported RAMs such as VRAMs and TVRAMs are faster than ordinary DRAMs and are very useful in video applications due to high-speed capabilities and due to the fact that video data usually are sequentially organized in pixels and lines. The VRAM is written according to an address pattern that corresponds to the scan pattern of the video image to be stored. That is, a sequence of lines of consecutive pixels of the image to be stored is mapped onto a group of memory cells of the VRAM that have logically adjacent memory addresses. The VRAM is read via a shift register that periodically is reloaded with the contents of such a group of cells to furnish the line's pixels consecutively. Reading and writing of the VRAM can be done at mutually different time rates. A TVRAM further is adapted to be written and read at the same moment, it being provided with two (or more) shift registers to retrieve and enter pixel data in line fashion.

Each word provided by encoders 116–120 represents a source pixel derived from the associated video signal and includes several bits, a first part whereof contains encoded color or grey level information for that source pixel, and a second part whereof specifies the video format of the video signal to serve as a key for eventually decoding the first part later on. Conversion of an analog video signal such as a TV signal into a sequence of digital pixels is known in the art. Note, however, that in the invention the pixel's digital color information is combined with an identifier for the associated video format, and the combination is provided in a digital representation supported by MSMF 10.

Display memory 104 receives the digital words from multiplexing means 122 on a pixel-by-pixel basis and functionally comprises following sections: a source information section 124, a color information section 126 and a format indicating section 128. Source information section 124 specifies in advance for each destination pixel of monitor 20 which one of video signals I1–In is to be selected to produce the source pixel for mapping onto the destination pixel. Section 124 controls the operation of multiplexing means 122. Color information section 126 stores for each destination pixel the first part of the digital word received from multiplexing means 122, i.e., the color information of the selected source pixel. Format indicating section 128 stores for each destination pixel the second part of the digital word received from multiplexing means 122, i.e., the video format indication for the selected source pixel.

Display memory 104 may be implemented in various ways and may include a DRAM (dynamic RAM), a VRAM or a TVRAM. Such RAMs may be physically organized in several banks to increase storage capacity and access speed. Note that the speed per bank can be reduced when bank-switching techniques are applied, such as storing data for subsequent destination pixels in logically contiguous banks. Color information section 126 and format indicating section 128 are preferably implemented with a one or more TVRAMs in view of the required fast-in-fast-out behaviour (high update rate). Source information section 124 preferably is implemented with one or more ordinary VRAMs or DRAMs, since updating of section 124 is typically done at a substantially lower rate than the updating of sections 126 and 128.

Encoders 116–120 may be adapted to encode video signals received at inputs 110–114 in internal representations that are mutually different. That is, encoders 116–120 may be made programmable to handle words of various widths. The number of bits used to encode the colour information per source pixel may be variable depending on the type of video signal to be encoded. This may stem from the fact that a video signal of a particular type needs fewer bits per source pixel to represent the pixel's available color information than a video signal of another type. By providing section 126 in addition with adequate memory management means (not shown) to handle variable word lengths, an efficient use is made of the available memory space.

Decoding section 106 receives the colour information parts of the source pixels stored in section 126 and handles the conversion of the digital colour information into the analog format of monitor 20. Decoding section 106 comprises a plurality of decoders 130, 132, . . . , 134. Each different one of decoders 130–134 operates on the digitally encoded colour information parts of a different video format. Therefore, when section 126 produces a color colour information part of a source pixel, section 128 supplies the associated format information part of that source pixel to select the associated one of decoders 130–134.

For instance, format indicating section 128 may specify the colour information bits received by decoding section 106 from section 126 to be an encoded representation of a pixel created from an analog signal in YUV format at one of inputs 110–114. The appropriate one of decoders 130–134 is selected to operate on that representation. The operation involves interpreting the color information bits as encoded YUV information and converting this information into a decoder output signal, whose format is adapted to the video format of monitor 20, e.g. analog RGB. The conversion requires a dedicated YUV/RGB converter that performs the true-colour space conversion to produce the RGB from the YUV. The decoder output signal is transferred by multiplexing means 136 to monitor 20 under control of format indicating section 128.

In another example, format indicating section 128 may specify the colour information bits received by decoding section 106 from section 126 to be an encoded representation of a pixel created from an analog signal in an RGB format at one of inputs 110–114. The appropriate one of decoders 130–134 is selected to operate on that representation. The operation involves interpreting the color information bits as encoded RGB information and converting this information into an RGB decoder output signal, whose format is adapted to the video format of monitor 20. The RGB video signal at one of inputs 110–114 may need adaption to the physical characteristics of monitor 20, due to the particular phosphor compounds used in the monitor's screen. This may be taken care of by a dedicated RGB/RGB decoder. This kind of operation is termed "gamma-correction".

In still another example, format indicating section 128 may specify the color information bits received by decoding section 106 from section 126 to be an encoded representation for the color of a destination pixel created from a signal at one of inputs 110–114 that does not represent a color or a grey level. This may be the case for data that are not directly related to visual perception. Examples are spatial temperature distribution, spatial humidity distribution, topologic surface characteristics or other parametrized features, e.g., as obtained by remote sensing techniques from satellites, that are to be visualized. These data may be rendered visually perceptible by creating a plurality of parameter ranges for the feature to be visualized and displaying the feature's spatial distribution by means of a spatial color distribution, a particular colour corresponding to a particular parameter range. This display technique employs pseudo-color. In such pseudo color application, an appropriate one of decoders 130–134 is selected by section 128. The selected decoder is a pseudo-colour decoder and interprets the color information bits from section 126 as encoded non-colour information that is to be converted into a color output signal, whose format is adapted to the video format of monitor 20. This interpretation and conversion may be accomplished by the decoder through a color-look-up-table (CLUT).

Preferably, the output signals supplied by decoders 130–134 are digital signals, since multiplexing digital signals is simpler than multiplexing analog signals. A digital-analog converter (DAC) 138 then is provided between an output of multiplexing means 136 and monitor 20.

In the example shown in FIG. 2, encoding section 102, decoding section 106 and display memory 104 are controlled by PC 40 via an interface means 108. Interface means 108 comprises a bus 140 for read/write data transport and control data transport. Bus 140 is connected to an encoding control unit 142, a still-picture control unit 144, a memory control unit 146 and a decoding control unit 148.

Encoding control unit 142 serves to control the operation of encoders 116–120. For instance, a modification of the encoding operation for one or more of encoders 116–120 may be introduced via unit 142 in case the video format of one or more of video signals I1–In is changed. Alternatively, unit 142 may introduce a modified encoding procedure into encoders 116–120, for example, when display memory 104 is replaced by a smaller display memory. Data compression techniques or lower resolution encoding may then be introduced via unit 142.

Decoding control unit 148 controls the operation of decoding section 106. For instance, unit 148 may modify the CLUT in the appropriate one of decoders 130–134 for changing the pseudo-color representation. Alternatively, unit 148 may adapt the decoding procedure, for example when monitor 20 is replaced by another one of another type. As mentioned above, "gamma-correction" may be required to correctly adjust the shades of the color used.

Memory control unit 146 controls the operation of display memory 104. Source information section 124 may be programmed via unit 146. The words stored at particular addresses of section 126 and section 128 may be retrieved via unit 146 under PC 40 control for processing or monitoring in PC 40. A further application may be to selectively store words supplied by PC 40 via unit 146 in section 126 and/or in section 128.

Still-picture control unit 144 is provided to selectively prevent writing in address regions of section 126 and/or in section 128 in order to maintain the stored information. Accordingly, since display memory 104 locally remains unchanged, one or more still pictures are created in areas on monitor 20 that corresponds to the selected address regions of sections 126 and/or 128. Unit 144 may be operated upon by PC 40 via bus 140, for instance, for storage of information specifying which ones of the destination pixels of the composite image in monitor 20 are to be kept still. Unit 146 may directly control display memory 104 by selectively preventing memory locations from being overwritten. This may be useful when handling a one-time-only video signal, i.e., once the video signal has supplied a complete image, the signal is terminated. Alternatively, unit 144 may control encoders 116–120 by selectively putting the encoding procedure on hold. Encoders 116–120 may be provided with a memory function to store the encoded information prior to supplying the encoded information to multiplexing means 122. Stopping encoding then does not produce new pixel information, and the same pixels stored in encoders' 116–120 memories are provided during each new composite-image-cycle. Encoders' 116–120 memories then are adapted to supply the same pixels more than once.

In another embodiment, still-picture control unit 144 may control the storing of source pixels in display memory 104 by selectively assigning a "valid" flag or an "invalid" flag to a source pixel provided by multiplexing means 122. If the current source pixel is "valid", display memory accepts the source pixel to be stored at a predetermined address. If, on the other hand, the current source pixel is said to be "invalid", it is discarded and display memory 104 retains the information already stored at the predetermined address.

PC 40 may provide appropriate clocking to run encoding section 102, display memory 104, decoding section 106 and interface means 108.

Second Example of System in the Invention

Figure 3:
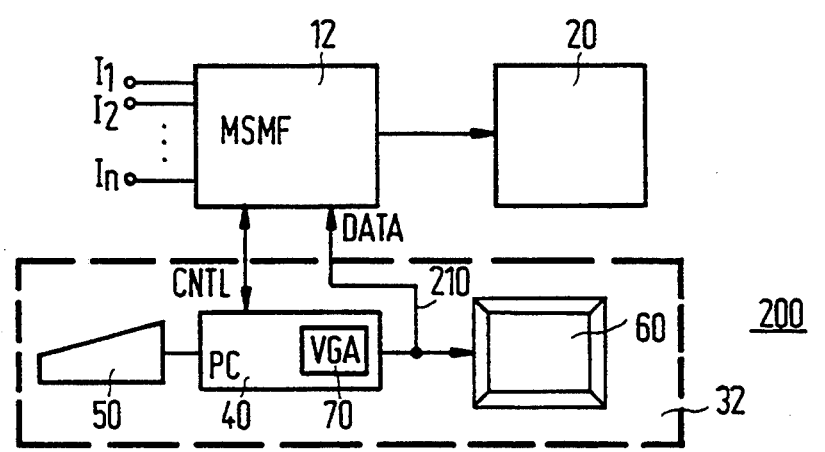
FIGS. 3 and 4 illustrate a second example of a system in the invention.
Figure 4:
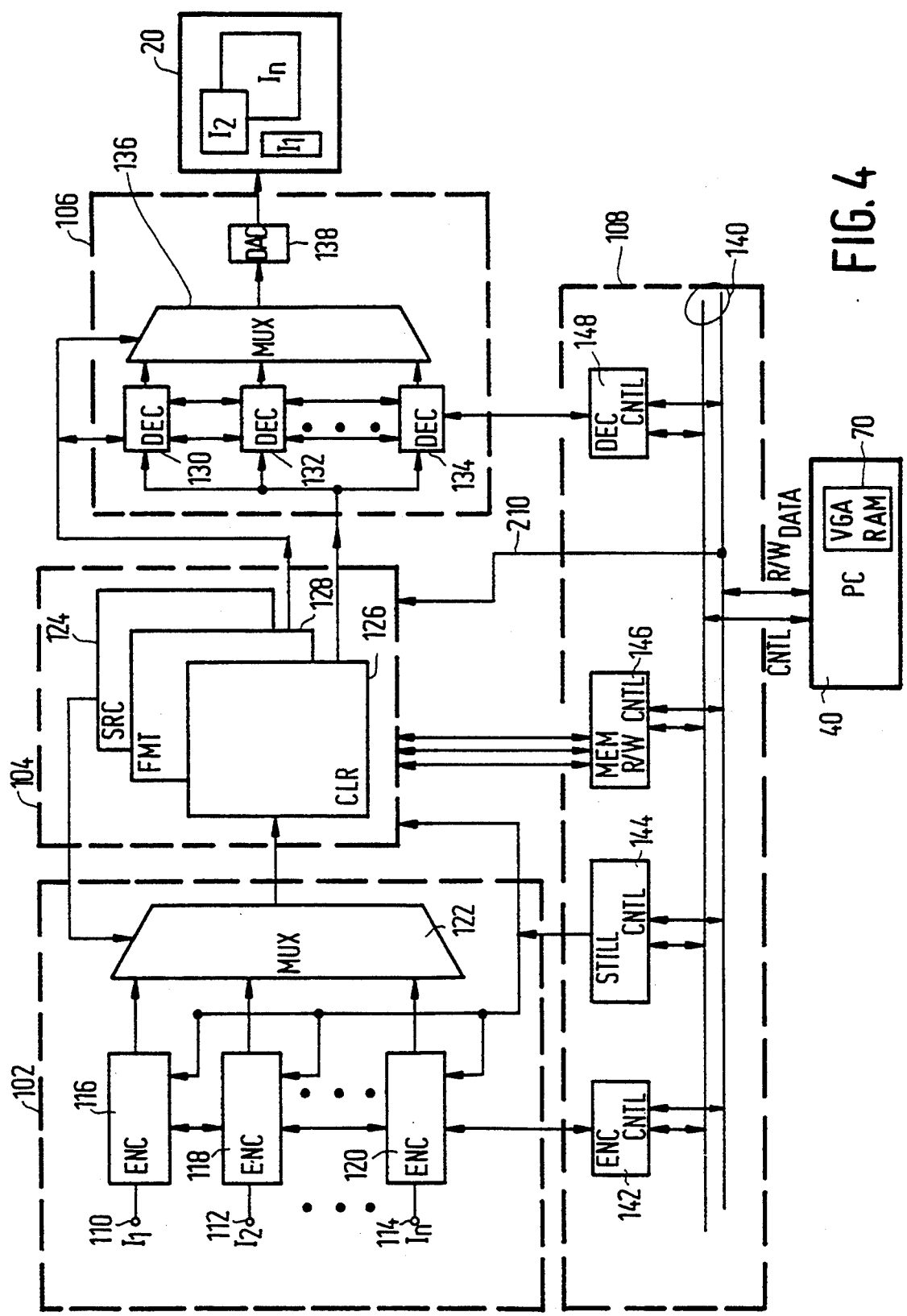

FIGS. 3 and 4 disclose a second example of a system 200 according to the invention. Features that correspond to those already discussed under FIG. 1 are denoted by the same reference numerals. System 200 now specifically combines video signals I1–In with one another and with computer-generated graphics data provided at a graphics bus 210 (feature bus) of, e.g., PC 40, via an MSMF 12, slightly different from MSMF 10 discussed above.

In FIGS. 3 and 4, PC 40 has a supervisory function as discussed under FIGS. 1 and 2 and, in addition, serves to supply graphics data to be selectively combined on a pixel-by-pixel basis with video signals I1–In. Functionally, the graphics data can be handled similarly to video signals I1–In. That is, the graphics data could be routed to, e.g., input 114 of encoder 120 in encoding means 102 of FIG. 2, provided that encoder 120 is adapted to handle graphics data. This option would not need a VGA 70 physically present in PC 40 as the encoder could be provided with a VGA. Alternatively, the graphics data could be supplied directly to multiplexing means 122 if the graphics data are already in the appropriate format, thereby avoiding a dedicated encoder. However, graphics data are already available in graphics unit 70 on a random access basis, as contrasted with a raster scan basis of typical video signals. Accordingly, graphics data are suitable to be introduced selectively and directly into display memory 104 via graphics bus 210, bypassing encoding section 102.

An appropriate one of decoders 130-134 then is selected, functionally via format indicating section 128 in a similar way as discussed above, in order to convert the graphics data via a CLUT (not shown) into a signal for monitor 20. This CLUT preferably is programmable, e.g., via decoding control unit 148.

Third Example

Figure 5:
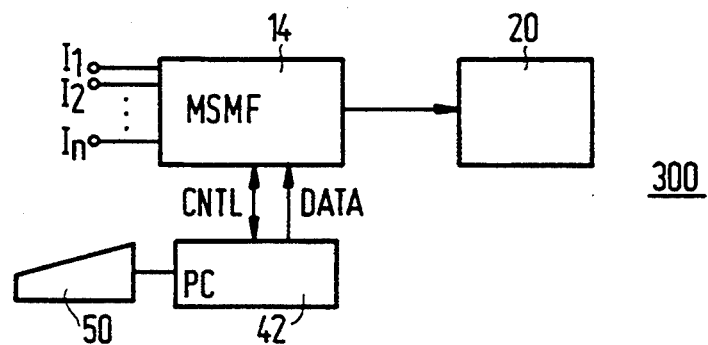
FIGS. 5 and 6 show a third example of a system in the invention.
Figure 6:
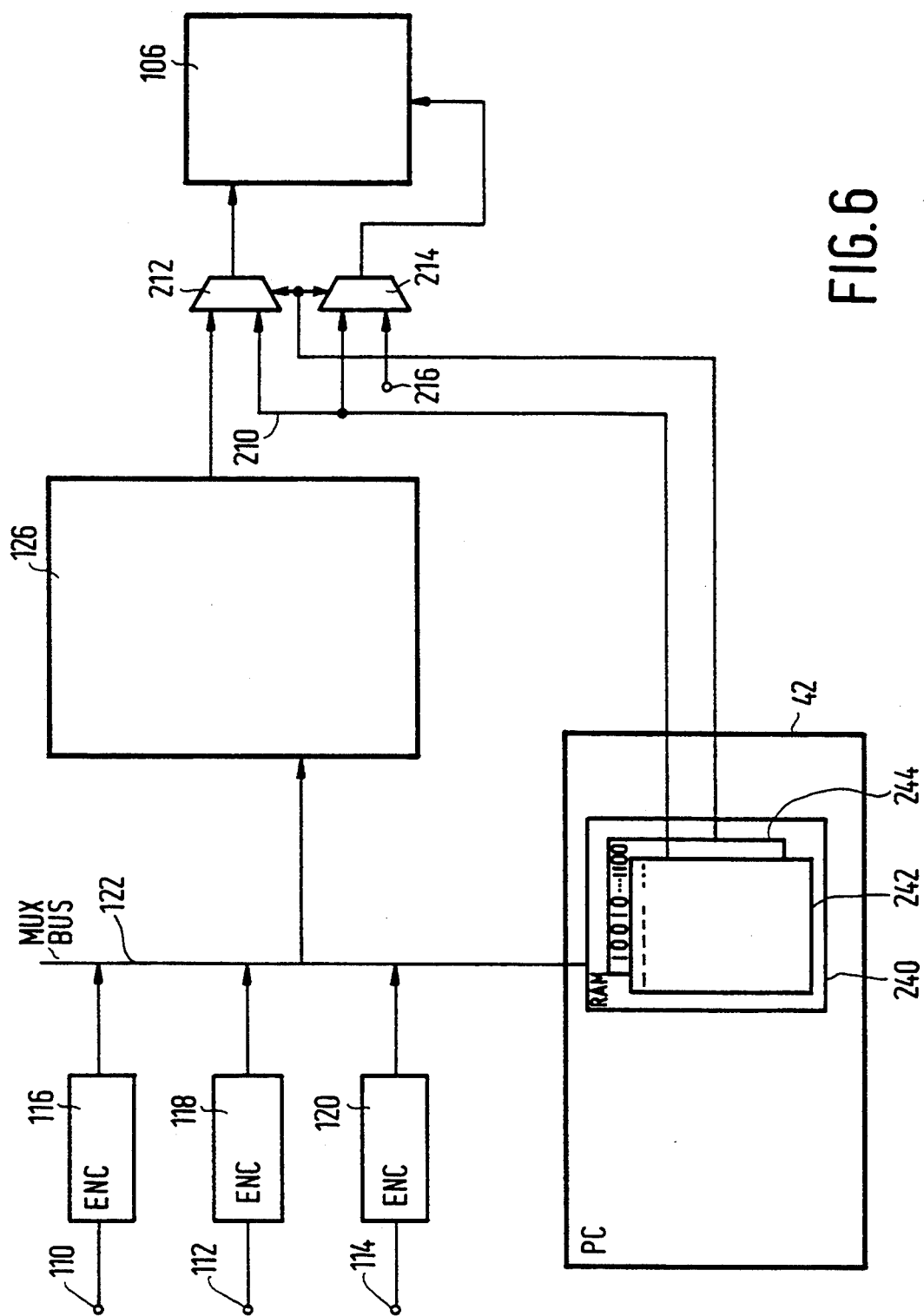

FIGS. 5 and 6 illustrate a third example of a system 300 in the invention. Since graphics data are generated on a random-access-basis, the memory functionality of graphics unit 70 in FIG. 3 may be physically merged with that of display memory 104 in FIG. 4. A PC 42 in FIG. 5 then does not need a graphics unit with a VGA and with a graphics data memory, since graphics data in a predetermined digital format may directly be stored in display memory 104. Decoding section 106 then includes an appropriate decoder, say, decoder 134 to transform the graphics information into an output signal to be handled by monitor 20 upon DA conversion in DAC 138.

Circumventing display memory 104 altogether as far as graphics data storage is concerned is achieved in an alternative embodiment of system 300, shown in FIG. 6. When graphics data are merged with video signals under source- and format-control as discussed above, the graphics data itself may serve both as a displayable data and as a control signal to govern the decoding performed on the color identifiers supplied by display memory 104. This is explained as follows.

The graphics data as produced by PC 42 are organized as (N+1)-bit wide words. If the additional bit is a logic "1", then the remaining N bits of the graphics word are to be interpreted as graphics color information for a particular destination pixel and for being processed by decoding section 106. If the additional bit is a logic "0", then all or some of the remaining N bits are to be interpreted to control the proper decoding of the colour information supplied display memory 104.

PC 42 produces (N+1)-bit wide data words in a RAM 240, functionally organized as an N-bit wide RAM 242 and a single-bit wide RAM 244 whose addresses are correlated. When RAM 244 has a "1" at a particular address, then the word at the corresponding address of RAM 242 denotes a particular color and is to be decodes as such in decoding section 106. When RAM 244 has a "0" at a particular address, then the word at the associated address of RAM 242 is to be interpreted as a control signal to select the proper decoding protocol performed in decoding section 106 for the selected data item provided by display memory 104.

Decoding section 106 selectively handles both graphics data supplied via bus 210 and data items supplied by display memory 104. To this end, system 300 includes a multiplexer 212 and a multiplexer 214. Multiplexer 212 transfers either graphics data supplied via bus 210 or data items received from display memory 104 to be decoded by decoding section 106. Multiplexer 214 transfers either data supplied via bus 210 or data supplied to a multiplexer input 216 in order to select an appropriate decoding protocol. Multiplexers 212 and 214 are controlled via the single bits provided by RAM 244. When multiplexer 212 is controlled to transfer the data received from display memory 104, then multiplexer 214 is controlled to transfer the dam received via bus 210 to a control input of decoding section 106, thereby selecting an appropriate one of the decoders (not shown) housed in section 106. When multiplexer 212 is controlled to transfer the data received via bus 210, then multiplexer 214 is controlled to transfer the signal at its input 216 to decoding section 106, thereby selecting the appropriate decoder, e.g., a CLUT (not shown) to interpret the data provided by multiplexer 212 as a color. The signal at input 216 may be a fixed word, or may be alterable by an external agent, or may be supplied by PC 42.

In the embodiment of FIG. 6, format indicating section 128 of FIG. 4 is implemented as RAM 242 in PC 42. Also, source information section 124 of FIG. 4 may be implemented in RAM 240 to control a bus 246 as multiplexer 122 of FIG. 4, and to act in concert with RAM 242 serving as format indicating section 128. FIGS. 1-6 illustrate some functionalities within the system as separate features. However, two or more of the functionalities may be physically integrated together within a single device of the system.

Note that the term "color" is used herein to indicate any aspect of an information item that can be made visually perceptible as a pixel. For the purpose of this invention, color therefore may include aspects such as grey level, shading or any other aspect that serves to visually differentiate image constituents.

What is claimed:

1. A system for creating a composite image having a plurality of destination pixels by selectively combining a plurality of simultaneously available video signals, each of said video signals including a plurality of source pixels, said system comprising:
    input means for receiving the plurality of video signals, each of said video signals having a predetermined video format the number of video formats being greater than one;
    encoding means coupled to said input means for encoding each source pixel of each video signal into a data item, each data item corresponding to said corresponding destination pixel and including a color identifier and a video format identifier;
    multiplexing means coupled to the encoding means for selecting one of the data items;
    memory means for storing the selected data item; and
    decoding means coupled to the memory means for decoding the selected data item to determine a color and the format of one of said corresponding destination pixels.

2. The system of claim 1, wherein the memory means includes:
    a color identifier section to store the color identifier of the selected data item; and
    a format identifier section to store the format identifier of the selected data item.

3. The system of claim 2, wherein the memory means includes a source identifier section to store a source identifier for controlling the multiplexing means.

4. The system of claim 1, further including
    control means for specifying whether the plurality of video signals or the computer-generated graphics data is to determine the color of the destination pixel; and further multiplexing means coupled between the memory means and the decoding means for determining the color of the destination pixel under control of the control means by one of:

transferring the color identifier supplied by the memory means to the decoding means and transferring the graphics data to the decoding means for decoding the color identifier under control of the graphics data, functioning as the format identifier;

and transferring the graphics data to the decoding means for being decoded.

5. The system of claim 4, further including a graphics data generator and wherein the memory means includes:

a color identifier section to store the color identifier of the selected data item;

a format identifier section to store the format identifier of the selected data item;

and wherein the graphic generator includes the format identifier section.

6. The system of claim 5, wherein the graphics generator includes the control means.

7. The system of claim 5, wherein the memory means has a source identifier section for storing a source identifier for control of the multiplexing means, the source identifier included in the graphics generator.

8. The system of claim 6, wherein the memory means has a source identifier section for storing a source identifier for control of the multiplexing means, the source identifier included in the graphics generator.

* * * * *